3,057,904
PREPARATION OF ESTERS OF TRIVALENT PHOSPHORUS ACIDS

Theodor Reetz, Webster Groves, William A. Busch, St. Louis, and David H. Chadwick, Webster Groves, Mo., assignors to Monsanto Chemical Company, St. Louis, Mo., a corporation of Delaware
No Drawing. Filed Sept. 4, 1958, Ser. No. 758,882
16 Claims. (Cl. 260—461)

This invention relates to an improved method of preparing esters of trivalent phosphorus acids.

Although the present invention encompasses phosphite, phosphonite, and phosphinite esters, the invention has particular application with respect to making phosphite esters and accordingly the ensuing description will place particular emphasis thereon, and especially upon the trialkyl phosphites.

It is known in the art that trialkyl phosphites can be prepared by reacting an alcohol with phosphorus trichloride in the presence of an organic base such as pyridine or dimethylaniline plus an inert hydrocarbon solvent (C. A. Milobendski, 1919, 2865 and Patent No. 2,175,509), but to obtain trialkyl phosphite in good yields involves serious problems of separation of the trialkyl phosphite from the resultant reaction mass. It is also known that trialkyl phosphites can be prepared by reaction of phosphorus trichloride with an alcohol in the presence of a solvent in which anhydrous ammonia is used as the scavenger (U.S. 2,678,940). The rate of ammonia addition is regulated so that the reaction stays essentially at the neutral point. If the reaction mixture is allowed to remain quite acidic during the entire reaction, almost none of the triester is obtained. If the reaction mixture is allowed to remain quite basic, or even under a positive pressure of ammonia, the yield of trialkyl esters is unsatisfactory, and the distilled product is frequently contaminated with other phosphorus derivatives or other phosphorus containing compounds resulting from side reactions. It is apparent that this process is quite sensitive and necessitates exact control of reaction conditions.

It is an object of the present invention to provide an improved method of preparing trialkyl phosphites in substantial yields by reacting phosphorus trichloride with an alcohol.

It is a further object of this invention to provide a method of preparing trialkyl phosphites in which the desired trialkyl phosphite may be readily separated from the reactant mass upon completion of the reaction and the scavenger may be readily recovered without necessity of filtration.

Another object of this invention is to provide a method of separating the trialkyl phosphite from the reaction mass by distillation at elevated temperatures without decomposing the trialkyl phosphite.

Another object of this invention is to provide a method of preparing trialkyl phosphites in which the phosphorus trichloride and anhydrous ammonia need not be added to the reaction mass in exact stoichiometric balance provided that the above reactants are substantially stoichiometrically equivalent at the termination of the reaction period.

Another object of this invention is to provide a method of preparing trialkyl phosphites in which a high ratio of product per volume of total reaction mixture is obtained.

Another object of this invention is to obtain higher yields of the desired trialkyl phosphite.

Another object of this invention is to provide a method of preparing trialkyl phosphites in which the reaction can take place at temperatures in excess of 25° C. with a minimum formation of the undesired mono- and dialkyl-phosphites as side products.

Other objects of this invention will become apparent from the following description.

According to this invention esters of phosphorous, phosphonous, and phosphinous acids of the general structure $A_nP(OR)_{3-n}$, where A is a member selected from the group consisting of alkyl, aryl, haloaryl and alkaryl radicals having from 1 to 8 carbons, n has a value from 0 to 2 and R is an alkyl radical having from 1 to 13 carbon atoms, are prepared by a process which comprises reacting a phosphorus compound of the general formula $A_nPX_{3-n}$, where A and n have the same meaning as above and X is a halogen selected from the group consisting of chlorine and bromine, with an alcohol of the general formula ROH, where R has the same meaning as above, in an excess of a tertiary amine based on the phosphorus compound $A_nPX_{3-n}$ used, and thereafter treating the resulting reaction mixture with anhydrous ammonia to form a stable system comprising an ester of the phosphorus acid used, a free amine and an ammonium halide.

According to an embodiment of the invention all of the phosphorus compound of the formula $A_nPX_{3-n}$ is added to the mixture of alcohol and excess tertiary amine followed by the addition of all of at least a stoichiometric amount of anhydrous ammonia (see Example V below). Similar results can also be obtained by adding a portion of the phosphorus compound $A_nPX_{3-n}$ to the mixture of alcohol and excess tertiary amine followed by the addition of a portion of the ammonia, and this procedure is continued by concurrently flowing in both the phosphorus compound and ammonia provided that the phosphorus compound remains in excess of the ammonia during this addition period. When all of the phosphorus compound has been added, then the remainder of the anhydrous ammonia is introduced into the reaction mixture (see Example I below). It is obvious that the addition of the phosphorus compound and anhydrous ammonia also may be done stepwise provided that all of the phosphorus compound is added before all of the ammonia is added.

The tertiary amine in the above reaction serves several useful purposes in the reaction besides functioning as a scavenger for the hydrogen chloride formed. In conventional methods for preparing esters of phosphorus acids, equivalent amounts of the tertiary amine have been used, for example, 3 mols of amine for each mol of phosphorus trichloride. As a result the local acidifying of the reaction mixture during the addition of phosphorus trichloride occurs to a much greater extent. However, in the present invention where an excess of amine in terms of the phosphorus halide is used, several other advantages arise. First, the excess amine serves as a solvent. Second, the excess amine virtually eliminates undesirable side reactions such as the formation of incomplete esters of the phosphorus acid due to acidifying. Third, the use of excess amine permits a faster addition of the phosphorus halide compound since special control of the addition rate of the halide compound is not required.

The use of anhydrous ammonia in the above reaction is for the purpose of obtaining a stable reaction system in which no undesirable side reactions take place during the working up. To illustrate the stabilizing effect of ammonia, 100 g. of trimethyl phosphite was heated in the presence of dimethylaniline and dimethylaniline hydrochloride for 2 hours at 65° C. Eighty-seven (87) percent of the trimethyl phosphite was destroyed. On the other hand, when a mixture of trimethyl phosphite, dimethylaniline, and dimethylaniline hydrochloride was treated with ammonia and then heated through a temperature range of 65° to 100° C. for 2 hours, there was no indication of any decomposition.

The following examples are offered to illustrate the specific preferred methods of carrying out the invention.

EXAMPLE I

Trimethyl Phosphite

To a suitable reactor vessel equipped with thermometer and stirrer are added 602.2 gm. (5.0 mols) of N,N'-dimethylaniline and 152.0 gm. (4.75 mols) of methanol. Approximately 30 gm. of phosphorus trichloride is slowly added. Then anhydrous ammonia and phosphorus trichloride are concurrently added at a rate such that the ammonia is always 10–20 percent of the stoichiometric amount behind the trichloride during an addition period of 5.5 hours. At the end of this period additional ammonia is added, bringing the total to 76.5 gm. (4.5 mols) while the total phosphorus trichloride aggregates 206.0 gm. (1.5 mols). The temperature varies between 35–40° C. during the entire addition period. The crude trimethyl phosphite is then stripped from the reaction mass at a reduced pressure of 20 mm. of Hg absolute through a six inch punched, vacuum jacketed, glass column. The final vapor temperature/pressure condition under which the phosphite is removed is 85–87° C. and 20 mm. of Hg absolute, respectively. The remaining distillant of ammonium chloride-dimethylaniline mixture is then separated by the addition of approximately 252 mols of tap water. The ammonium chloride dissolves in the aqueous layer and is readily separated from the wet dimethylaniline. The crude trimethyl phosphite is redistilled giving a yield of water-white liquid trimethyl phosphite amounting to 73.4 percent of theory based on the phosphorus trichloride.

The use of 925.0 gm. (5.0 mols) of tri-n-butylamine instead of dimethylaniline gives results comparable to those obtained with dimethylaniline, namely, 69.3 percent yield of theory.

EXAMPLE II

Triethyl Phosphite

Employing the same general procedure of Example I but replacing the methanol by 218.5 gm. (4.75 mols) of ethanol, there is obtained triethyl phosphite in good yield.

EXAMPLE III

Tributyl Phosphite

The procedure of Example I is repeated, but the methanol is replaced by 351.5 gm. (4.75 mols) of n-butanol. The resulting tributyl phosphite is obtained in good yield and purity by washing out the resulting ammonium chloride and distilling off the dimethylaniline.

EXAMPLE IV

Trioctyl Phosphite

Into a reactor equipped with a stirrer, dropping funnel, thermometer and gas inlet tube is charged 203.5 g. (1.58 mols) of 2-ethylhexanol and 297.0 g. (3.28 mols) of N,N-dimethylaniline. The mixture is stirred vigorously during the addition of 68.7 g. (0.50 mol) of phosphorus trichloride over a three hour period. After approximately one-fourth of the phosphorus trichloride is added, the addition of anhydrous ammonia is begun at such a rate as to maintain a stoichiometric excess of phosphorus trichloride over ammonia. After completion of the phosphorus trichloride addition, the addition of ammonia is continued until the reaction mass is basic as indicated by bromocresol green indicator. A total of 25.5 g. (1.50 mols) of ammonia is used. The temperature during the reaction is maintained at 35–40° C. Upon completion of the ammonia addition, the reaction mass is washed with water to remove the ammonium chloride and dried prior to distillation. The dimethylaniline is then removed by distillation, and the crude tri-(2-ethylhexyl) phosphite is distilled (157–162° C. at 0.2 mm.). The colorless distillate of trioctyl phosphite weighs 171.5 g. which is 81.5% of the theoretical amount. Its refractive index, $n_D^{25}$ is 1.4470.

EXAMPLE V

Trimethyl Phosphite

To a mixture of 100.8 g. of methanol and 1000 g. of dimethylaniline is added 137 g. of phosphorus trichloride at 5°–8° C. with vigorous stirring over a period of 60 minutes. Then 51 g. of the gaseous ammonia is introduced at 10°–15° C. within 60 minutes. The mixture is distilled under reduced pressure (10 mm.) to a pot temperature of 30°–70° C. The distillate is then redistilled. There is obtained 105.4 g. of pure trimethyl phosphite which represents a yield of 85.0 percent.

EXAMPLE VI

Trimethyl Phosphite

To a mixture of 100.8 g. of methanol and 1000 g. of diethylaniline is added 137 g. of phosphrous trichloride at 5°–8° C. over a period of 60 minutes. Then 52 g. of anhydrous ammonia is introduced at 10°–15° C. The reaction mixture is vigorously stirred during the addition of the reagents and the subsequent distillation thereof. The trimethyl phosphite is stripped at reduced pressure and elevated temperature. The distillate is then redistilled under reduced pressure (170–175 mm.) There is obtained 103.4 g. of trimethyl phosphite (B.P. 68°–69° C.) which is 83.5 percent of theory.

EXAMPLE VII

Diethyl Methylphosphonite

To a solution of 145 g. (3.15 mols) of absolute ethyl alcohol and 600 g. (5 mols) of dry dimethylaniline in a 2-liter flask equipped with a mechanical agitator, thermometer, dropping funnel and gas inlet tube, and thoroughly flushed with nitrogen, is added slowly 117 g. (1 mol) of methyldichlorophosphine. The reaction mixture is maintained at a temperature of 25–30° C. by external cooling. Upon completion of the addition, the mixture is stirred for one hour, and then 35 g. (2 mols) of gaseous ammonia passed into the mixture at a rate such that it is all absorbed; the mixture is maintained at 25–30° C. by external cooling. During these operations the pressure in the flask is maintained at that of the atmosphere by admitting a very small stream of nitrogen and venting through a mercury seal.

The flask is then equipped for, and the mixture submitted to distillation under reduced pressure, a crude product, contaminated by dimethylaniline, being collected in an externally cooled receiver to a still vapor temperature of 85–87° C. at 20 mm. pressure. The crude product is redistilled through a 10-inch Vigreaux column under reduced pressure, diethyl methylphosphonite being collected at 55–60° C. at 80 mm. pressure.

EXAMPLE VIII

Dimethyl Phenylphosphonite

In a 2 liter flask equipped with a stirrer, dropping funnel, thermometer, and gas inlet tube is placed 453.0 g. (3.3 mols) of triallylamine and 49.3 g. (1.54 mols) of methyl alcohol. The mixture is stirred at 25° C. during the addition of 134.3 g. (0.75 mol) of phenyldichlorophosphine. Upon completion of the addition of phenyldichlorophosphine (1.25 hours), 25.5 g. anhydrous ammonia is added over a two hour period. Upon completion of ammonia addition, 300 ml. water is added to remove the ammonium chloride. The organic portion is then dried with magesium sulfate and the triallylamine removed by distillation. The crude dimethyl phenylphosphonite is thereafter distilled at 12.5 mm. (B.P. 90.5–91.5). The colorless distillate weighs 75.0 g., 60% of the theoretical amount.

EXAMPLE IX

Dimethyl p-Chlorophenylphosphonite

The procedure of Example VIII is repeated except that 160.0 g. (.75 mol) of p-chlorophenyl dichlorophosphine is used in place of the phenyldichlorophosphine, and 474.9 g. (3.3 mols) of tripropylamine is substituted for the triallylamine to obtain dimethyl p-chlorophenylphosphonite in good yield and purity.

EXAMPLE X

Ethyl Dimethylphosphinite

By employing the general procedure of Example VII but using 48.5 g. (1.05 mols) of absolute ethyl alcohol, 555 g. (3 mols) of tributylamine, 96.5 g. (1 mol) of dimethylchlorophosphine and 17 g. (1 mol) of the gaseous ammonia, ethyl dimethylphosphinite is obtained in good yields.

The above examples are to be understood as merely illustrative, and other phosphite, phosphinite, and phosphonite esters may be prepared by the process of this invention which is of a general nature. It is obvious that the alcohol may be reacted with phosphorus halide compounds or halophosphines other than those set forth in Examples VII, VIII, IX and X such as:

Ethyldichlorophosphine
m-Chlorophenyldichlorophosphine
Tolyldichlorophosphine
Ethylphenyldibromophosphine
Xylyldichlorophosphine
Butyldichlorophosphine
Hexyldichlorophosphine
Octyldichlorophosphine
o-Bromophenyldichlorophosphine and the like to form the corresponding phosphonite.

Representative of the phosphonites which may be prepared are the following compounds:

Dibutyl butylphosphonite
Diethyl p-chlorophenylphosphonite
Dioctyl methylphosphonite
Dihexyl tolylphosphonite
Didodecyl ethylphosphonite
Dioctyl xylylphosphonite
Dibutyl ethylphenylphosphonite
Dimethyl m-bromophenylphosphonite and the like.

Moreover, this invention is applicable where the following type of phosphorus halide compound is reacted with alcohols having from 1 to 13 carbon atoms to form the corresponding phosphinite:

Diphenylchlorophosphine
Dimethylchlorophosphine
Di-(p-chlorophenyl) chlorophosphine
Diethylchlorophosphine
Di-(m-chlorophenyl) chlorophosphine
Di-(ethylphenyl) bromophosphine
Di-xylylchlorophosphine
Dibutylchlorophosphine
Dihexylbromophosphine
Dioctylchlorophosphine
Di-(o-bromophenyl) chlorophosphine and the like.

Examples of phosphinites which may be prepared by this reaction are the following:

Ethyl di-(p-chlorophenyl) phosphinite
Butyl di-(o-chlorophenyl) phosphinite
Hexyl ditolylphosphinite
Methyl dixylylphosphinite
Butyl di-(ethylphenyl) phosphinite
Ethyl dimethylphosphinite
Methyl di-(m-bromophenyl) phosphinite
Tridecyl dimethylphosphinite
Butyl diethylphosphinite
Ethyl dibutylphosphinite
Ethyl ethylmethylphosphinite and the like.

It is also to be noted that numerous variations may be employed without departing from the spirit or scope of invention. Thus other tertiary amines may be used such as lutidine, collidine, diethyl aniline, triamyl amine, tripropyl amine, and others of a similar nature. In general the preferred tertiary amines are those which are not soluble in water and which have such boiling points as to facilitate the separation of the desired product from the reaction mass.

It is also evident that the process of this invention is applicable to mixed esters of phosphorus acids. In addition, examples of alcohols which may be employed in this reaction include methanol, ethanol, propanol, pentanol, octanol, decanol, tridecanol, and the like. Numerous examples of the phosphorus halide compounds which can be reacted with the foregoing alcohols have been set forth above, but others may be used such as phosphorus tribromide.

Although the phosphorus halide and ammonia may be added concurrently as illustrated by Example I, or successively or stepwise, as illustrated by Example V, the preferred method from the standpoint of ease of separation of the ester from the reaction mass is represented by the concurrent method in which a thin slurry is formed.

It is to be particularly noted that during the concurrent addition of phosphorus halide and the anhydrous ammonia after the initial addition of phosphorus halide, the latter is in stoichiometric excess of the ammonia until all of the phosphorus halide has been added, at which time sufficient ammonia is then added so that the stoichiometric proportions of phosphorus halide and ammonia become substantially equalized. However, if desired, additional ammonia may be added at this time such that the ammonia is in excess of the phosphorus halide provided all of the latter necessary for the reaction has been introduced.

The temperature at which the reaction is carried out is not absolutely critical in that it can be varied from 0° to 60° C., or higher where higher alcohols are used. The optimum conditions usually call for a minimum temperature of about 25° C. which inherently has the advantage of simplifying the cooling of this exothermic process.

By an excess of tertiary amine is meant that amounts of the amine are used which are more than the stoichiometric equivalent necessary to scavenge the hydrogen halide formed from the halogen present in the phosphorus halide compound. By way of example, where phosphorus trichloride is used as the phosphorus halide compound, at least 4 mols of the amine may be used and preferably 5 or more mols of the amine. The use of 8 mols, for example, of the tertiary amine is not excessive and only practical and economic considerations will determine the amount of excess amine that can be used.

It will be evident from the foregoing description that this invention has provided a method of preparing esters of phosphorus acids in which there is a marked improvement in yields. For example, in the case of trimethyl phosphite the highest yields obtainable to date as indicated by a survey of the literature were around 45 percent. However, with the present invention yields are on the order of 80 percent and better. Since the ammonia and phosphorus halide compound need not be added in precise stoichiometric balance as taught by the art, it is also obvious that the present invention provides a more simplified method of preparing esters of phosphorus acid.

While this invention has been described with respect to certain embodiments, it is to be understood that additional variations and modifications thereof obvious to

What is claimed is:
1. In a method of making an ester of a trivalent phosphorus acid of the type $A_nP(OR)_{3-n}$, where A is a member selected from the group consisting of alkyl, aryl, haloaryl and alkaryl radicals having from 1 to 8 carbon atoms, $n$ has a value from 0 to 2, and R is an alkyl radical having from 1 to 13 carbon atoms, by reacting a trivalent phosphorus halide of the type $A_nPX_{3-n}$, where A and $n$ are defined as above, and X is a halogen selected from the group consisting of chlorine and bromine, with an alcohol of the general formula ROH, where R is defined as above, in the presence of a tertiary amine, the steps which comprise reacting said phosphorus halide and said alcohol in the presence of an excess of said tertiary amine to produce said ester and an amine hydrohalide, and thereafter adding an amount of anhydrous ammonia which is at least stoichiometrically equivalent to the amount of amine hydrohalide produced during the reaction.
2. The method of claim 1 in which each R is methyl.
3. The method of claim 1 in which each R is ethyl.
4. The method of claim 1 in which each R is butyl.
5. The method of claim 1 in which each R is amyl.
6. The method of claim 1 in which each R is octyl.
7. In a method of making a trialkyl phosphite of the type

where R is an alkyl radical having from 1 to 13 carbon atoms, by reacting a phosphorus trihalide selected from the group consisting of phosphorus trichloride and phosphorus tribromide, with an alcohol of the general formula ROH, where R has the same meaning as above, in the presence of a tertiary amine, the steps which comprise reacting said phosphorus trihalide and said alcohol in the presence of an excess of said tertiary amine to produce said phosphite and an amine hydrohalide, and adding a total amount of anhydrous ammonia which is at least stoichiometrically equivalent to the amount of amine hydrohalide produced during the reaction, provided, however, that the amount of said ammonia which is added at any time during said reaction is less than an amount which is substantially stoichiometrically equivalent to the amount of amine hydrohalide produced at said time.
8. The process of claim 7 in which the reaction takes place at a temperature from 0° C. to 60° C.
9. In a method of making a trialkyl phosphite of the type

wherein each R is an alkyl radical having from 1 to 13 carbon atoms, by reacting a phosphorus trihalide selected from the group consisting of phosphorus trichloride and phosphorus tribromide, with an alcohol of the general formula ROH, where R has the same meaning as above, in the presence of a tertiary amine, the steps which comprise reacting said phosphorus trihalide and said alcohol in the presence of an excess of said tertiary amine to produce said phosphite and an amine hydrohalide, said phosphorus trihalide and anhydrous ammonia being added to said tertiary amine and said alcohol at such a rate that the amount of said anhydrous ammonia which is added at any time during the reaction is less than an amount which is substantially stoichiometrically equivalent to the amount of amine hydrohalide produced at said time, and, after all of said phosphorus trihalide has been added, continuing the addition of said anhydrous ammonia until the total amount of the latter which is added is at least stoichiometrically equivalent to the total amount of amine hydrohalide produced during said reaction.
10. The method of claim 9 in which the phosphorus trihalide is phosphorus trichloride.
11. The method of claim 9 in which the phosphorus trihalide is phosphorus tribromide.
12. The method of claim 9 in which the reaction takes place at a temperature from 0° C. to 60° C.
13. In a method of making a trialkyl phosphite of the type

wherein each R is an alkyl radical having from 1 to 13 carbon atoms, by reacting a phosphorus trihalide selected from the group consisting of phosphorus trichloride and phosphorus tribromide, with an alcohol of the general formula ROH, where R has the same meaning as above, in the presence of a tertiary amine, the steps which comprise reacting said phosphorus trihalide and said alcohol in the presence of an excess of said tertiary amine to produce said phosphite and an amine hydrohalide, all of said phosphorus trihalide being added in stepwise fashion, and thereafter adding, also in stepwise fashion, an amount of anhydrous ammonia which is at least stoichiometrically equivalent to the amount of amine hydrohalide produced during the reaction.
14. The method of claim 13 in which the reaction takes place at a temperature from 0° C. to 60° C.
15. The method of claim 13 in which the alcohol is methanol.
16. The method of claim 13 in which the phosphorus trihalide is phosphorus trichloride.

References Cited in the file of this patent
UNITED STATES PATENTS

| | | |
|---|---|---|
| 2,678,940 | Bayer et al. | May 18, 1954 |
| 2,865,942 | Chadwick et al. | Dec. 23, 1958 |
| 2,903,475 | Harowitz | Sept. 8, 1959 |
| 2,905,705 | Kohler et al. | Sept. 22, 1959 |